(12) United States Patent
Lee et al.

(10) Patent No.: US 10,498,986 B2
(45) Date of Patent: Dec. 3, 2019

(54) IMAGE SENSOR HAVING A TIME CALCULATOR AND IMAGE PROCESSING DEVICE INCLUDING THE SAME

(71) Applicant: Samsung Electronics Co., Ltd., Suwon-si, Gyeonggi-do (KR)

(72) Inventors: Hyeok-jong Lee, Yongin-si (KR); Se-jun Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 50 days.

(21) Appl. No.: 15/816,285

(22) Filed: Nov. 17, 2017

(65) Prior Publication Data

US 2018/0295301 A1    Oct. 11, 2018

(30) Foreign Application Priority Data

Apr. 10, 2017  (KR) ......................... 10-2017-0046298

(51) Int. Cl.
| | |
|---|---|
| *H04N 5/357* | (2011.01) |
| *H04N 5/376* | (2011.01) |
| *H04N 5/369* | (2011.01) |
| *H04N 5/341* | (2011.01) |
| *H04N 5/378* | (2011.01) |
| *H04N 5/232* | (2006.01) |
| *H04N 5/345* | (2011.01) |

(52) U.S. Cl.
CPC ......... *H04N 5/357* (2013.01); *H04N 5/23296* (2013.01); *H04N 5/341* (2013.01); *H04N 5/3454* (2013.01); *H04N 5/3698* (2013.01); *H04N 5/378* (2013.01); *H04N 5/3765* (2013.01)

(58) Field of Classification Search
CPC ...... H04N 5/357; H04N 5/3454; H04N 5/378; H04N 5/3765; H04N 5/341; H04N 5/23296; H04N 5/3698
See application file for complete search history.

(56) References Cited

U.S. PATENT DOCUMENTS

| | | |
|---|---|---|
| 5,307,167 A | 4/1994 | Park et al. |
| 5,521,636 A | 5/1996 | Nakayama et al. |
| 5,739,867 A | 4/1998 | Eglit |
| 7,355,643 B2 | 4/2008 | Shimomura et al. |

(Continued)

FOREIGN PATENT DOCUMENTS

| | | |
|---|---|---|
| JP | 4424097 B2 | 3/2010 |
| KR | 2006-0022575 A | 3/2006 |

*Primary Examiner* — Gevell V Selby
(74) *Attorney, Agent, or Firm* — Harness, Dickey & Pierce, P.L.C.

(57) ABSTRACT

Provided are an image sensor and an image processing device including the same. The image sensor includes: a pixel array including a plurality of pixels arranged in rows and columns and configured to generate pixel signals from the plurality of pixels, a time calculator configured to receive zoom information corresponding to digital zooming, and configured to calculate a row processing time available for processing the pixel signals from the plurality of pixels included in a single row based on the zoom information, a timing generator configured to generate at least one control signal based on the row processing time; and an Analog-to-Digital Converter (ADC) configured to generate pixel data by performing sampling on the pixel signals according to the at least one control signal.

20 Claims, 19 Drawing Sheets

(56) References Cited

U.S. PATENT DOCUMENTS

| | | |
|---|---|---|
| 7,554,479 B2 | 6/2009 | Lim |
| 8,508,627 B2 * | 8/2013 | Suzuki .................. H04N 5/232 |
| | | 348/240.2 |
| 2005/0057673 A1 * | 3/2005 | Shimomura ....... H04N 5/23241 |
| | | 348/294 |
| 2005/0253938 A1 * | 11/2005 | Kawaguchi .......... H04N 5/2178 |
| | | 348/240.1 |
| 2011/0141318 A1 * | 6/2011 | Lee .................. H01L 27/14618 |
| | | 348/240.2 |
| 2016/0037101 A1 * | 2/2016 | Shim ..................... H04N 5/374 |
| | | 348/241 |

* cited by examiner

FIG. 10B

|  | Number of Sampling |
|---|---|
| RPT1 ≤ RPT ≤ RPT2 | m1 |
| RPT2 < RPT ≤ RPT3 | m2 |
| RPT3 < RPT ≤ RPT4 | m3 |
| RPT4 < RPT | m4 |

IMAGE SENSOR HAVING A TIME CALCULATOR AND IMAGE PROCESSING DEVICE INCLUDING THE SAME

CROSS-REFERENCE TO RELATED APPLICATION

This application claims the benefit of Korean Patent Application No. 10-2017-0046298, filed on Apr. 10, 2017, in the Korean Intellectual Property Office, the disclosure of which is incorporated herein in its entirety by reference.

BACKGROUND

Inventive concepts relate to an image sensor, and more particularly, to an image sensor that may reduce noise during digital zooming and may reduce power consumption.

An image sensor may convert a light signal including image information of an object to an electrical signal. Widely used image sensors include a charge-coupled device (CCD) image sensor and a complementary metal-oxide semiconductor (CMOS) image sensor. With the development of the computer industry and the telecommunications industry, demand has increased for image sensors with improved performance in various electronic devices, such as digital cameras, camcorders, personal communication systems (PCS), game devices, security cameras, medical microcameras, and/or mobile phones.

In order to enlarge an image for an image sensor, optical zooming, which enlarges an image by adjusting a distance between lenses, and digital zooming, which enlarges an image by cutting out a portion of the image during shooting, may be used. In digital zooming, a new pixel value is interpolated using an existing image value when a zoom function is performed, and as a result of these characteristics, digital zooming shows a less delicate image than that shown by the optical zooming. Therefore, various studies are being conducted to reduce deterioration of an image during digital zooming.

SUMMARY

Inventive concepts provide an image sensor that may reduce noise during digital zooming and prevents image deterioration and an image processing device including the same.

Inventive concepts provide an image sensor that may reduce power consumption during digital zooming and an image processing device including the same.

According to an example embodiment of inventive concepts, there is provided an image sensor including a pixel array including a plurality of pixels arranged in rows and columns and configured to generate pixel signals from the plurality of pixels, a time calculator configured to receive zoom information corresponding to digital zooming, and configured to calculate a row processing time available for processing the pixel signals from the plurality of pixels included in a single row based on the zoom information, a timing generator configured to generate at least one control signal based on the row processing time; and an Analog-to-Digital Converter (ADC) configured to generate pixel data by performing sampling on the pixel signals according to the at least one control signal.

According to an example embodiment of inventive concepts, there is provided an image processing device including an image processor configured to calculate a row processing time available for processing pixel signals for a plurality of pixels included in a single row based on zoom information corresponding to digital zooming; and an image sensor including a timing generator configured to generate at least one control signal based on the row processing time, and an ADC configured to generate pixel data by performing sampling on the pixel signals according to the at least one control signal.

According to an example embodiment of inventive concepts, there is provided a computer system including an image processor configured to adaptively adjust an adjusted row processing time in response to receiving a digital zoom command and an image sensor configured to sample an image according to the adjusted row processing time.

BRIEF DESCRIPTION OF THE DRAWINGS

Example embodiments of inventive concepts will be more clearly understood from the following detailed description taken in conjunction with the accompanying drawings in which:

FIGS. 10A and 10B are views of a method of determining the number of times of sampling according to an example embodiment of inventive concepts.

DETAILED DESCRIPTION OF EXAMPLE EMBODIMENTS

Figure 1:
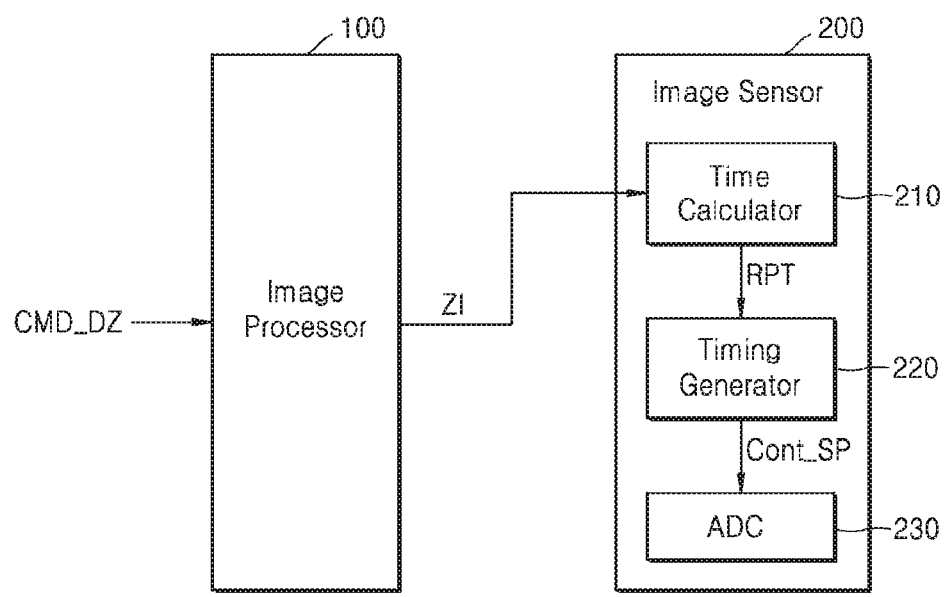
FIG. 1 is a block diagram of an image processing device according to an example embodiment of inventive concepts.

FIG. 1 is a block diagram of an image processing device 10 according to an example embodiment of inventive concepts.

Referring to FIG. 1, the image processing device 10 may include an image processor 100 and an image sensor 200.

The image processor 100 may process image data sensed and output by the image sensor 200, and output the processed image data to a display device. The image processor 100 may process image data to fit human eyes. The display device may include a device capable of outputting an image (e.g., a computer, a mobile phone, or an electronic device having a camera). The image processor 100 may be implemented, for example, as a digital signal processor (DSP), an image signal processor (ISP), and/or an application processor (AP).

The image processor 100 may receive a digital zoom command CMD_DZ from a user or a host. The digital zoom command CMD_DZ may include zoom information ZI according to digital zooming. The image processor 100 may extract the zoom information ZI from the received digital zoom command CMD_DZ, and output the extracted zoom information ZI to a time calculator 210.

In an example embodiment, the zoom information ZI may include at least one of information about an image size corresponding to an image to be output to the display device, information about a pixel address at which an image to be output is formed, and information about a digital zoom magnification, wherein the information about the image size may include the row number of a plurality of pixels to which data for the image to be output is input. This will be described later below with reference to FIG. 5.

The image sensor 200 may sense intensity of light of an object captured through a lens under the control of the image processor 100, and may convert the intensity of the sensed light into digital image data. The image sensor 200 may output the digital image data to the image processor 100. The image sensor 200 may include a time calculator 210, a timing generator 220, and an analog-to-digital converter (ADC) 230.

The time calculator 210 may calculate a row processing time RPT based on the zoom information ZI received from the image processor 100 and output the calculated row processing time RPT to the timing generator 220. The row processing time RPT may be the time taken for an image sensor to process a single row, and RPT=1/FPS×RN (where RPT is the row processing time, FPS is a frame rate per second, and RN is a row number, hereinafter referred to as a row processing time calculation formula). The row processing time RPT may also be referred to as one horizontal time (1H-time). According to an example embodiment of inventive concepts, the time calculator 210 may use the row number RN changed in correspondence with digital zooming in calculating the row processing time RPT.

According to an example embodiment of inventive concepts, a reference row processing time may be used when the time calculator 210 calculates the row processing time RPT. The reference row processing time may mean or may correspond to the row processing time RPT when digital zooming is not performed, for example, when the magnification is 1×. In an example, the time calculator 210 may calculate a value obtained by multiplying the reference row processing time by the magnification as the row processing time RPT.

The timing generator 220 may output a sampling control signal Cont_SP to the ADC 230 based on the received row processing time RPT. The ADC 230 may perform sampling on a pixel signal including image data for an object to be observed based on the received sampling control signal Cont_SP. Although FIG. 1 illustrates the time calculator 210 separately from the timing generator 220, inventive concepts are not limited thereto. The timing generator 220 may serve as the time calculator 210 according to example embodiments.

Figure 2:
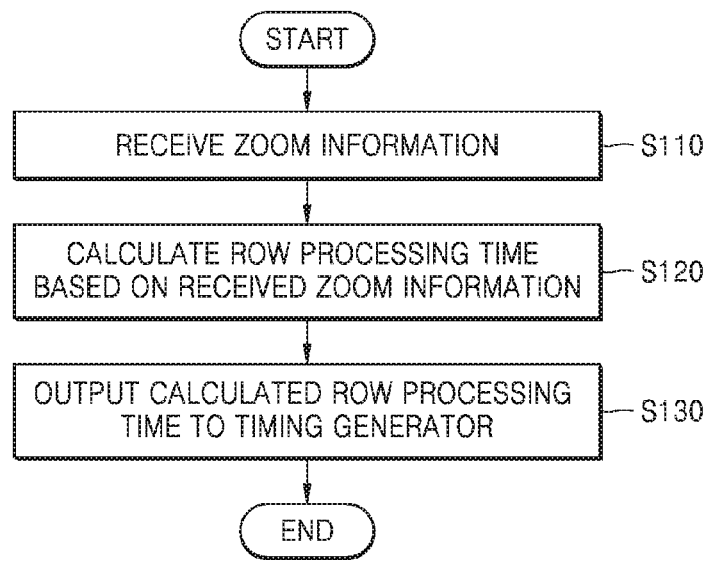
FIG. 2 is a flowchart of a method of operating a time calculator according to an example embodiment of inventive concepts.

FIG. 2 is a flowchart of a method of operating the time calculator 210 according to an example embodiment of inventive concepts.

Referring to FIG. 2, in operation S110, the time calculator 210 may receive the zoom information ZI from the image processor 100. The received zoom information ZI may include at least one of information about an image size corresponding to an image to be output to the display device, information about a pixel address to which data for the image to be output is input, and/or information about a digital zoom magnification, wherein the information about the image size may include the row number of a plurality of pixels to which data for the image to be output is input.

In operation S120, the time calculator 210 may calculate the row processing time RPT based on the received zoom information ZI. In an example, when the received zoom information ZI includes information about the row number which has changed in correspondence with the digital zooming, the time calculator 210 may substitute the changed row number into the row processing time calculation formula to calculate the row processing time RPT. In an example, when the received zoom information ZI includes information about the pixel address, the time calculator 210 may calculate the changed row number through the received pixel address and calculate the row processing time RPT by substituting the changed row number into the row processing time calculation formula. In an example, when the received zoom information ZI includes the information about magnification, the time calculator 210 may calculate, as the row processing time RPT, a value obtained by multiplying a reference row processing time by the magnification.

In operation S130, the time calculator 210 may output the calculated row processing time RPT to the timing generator 220. The timing generator 220 may adjust operation timing of the ADC 230 and/or similar items based on the received row processing time RPT.

Figure 3:
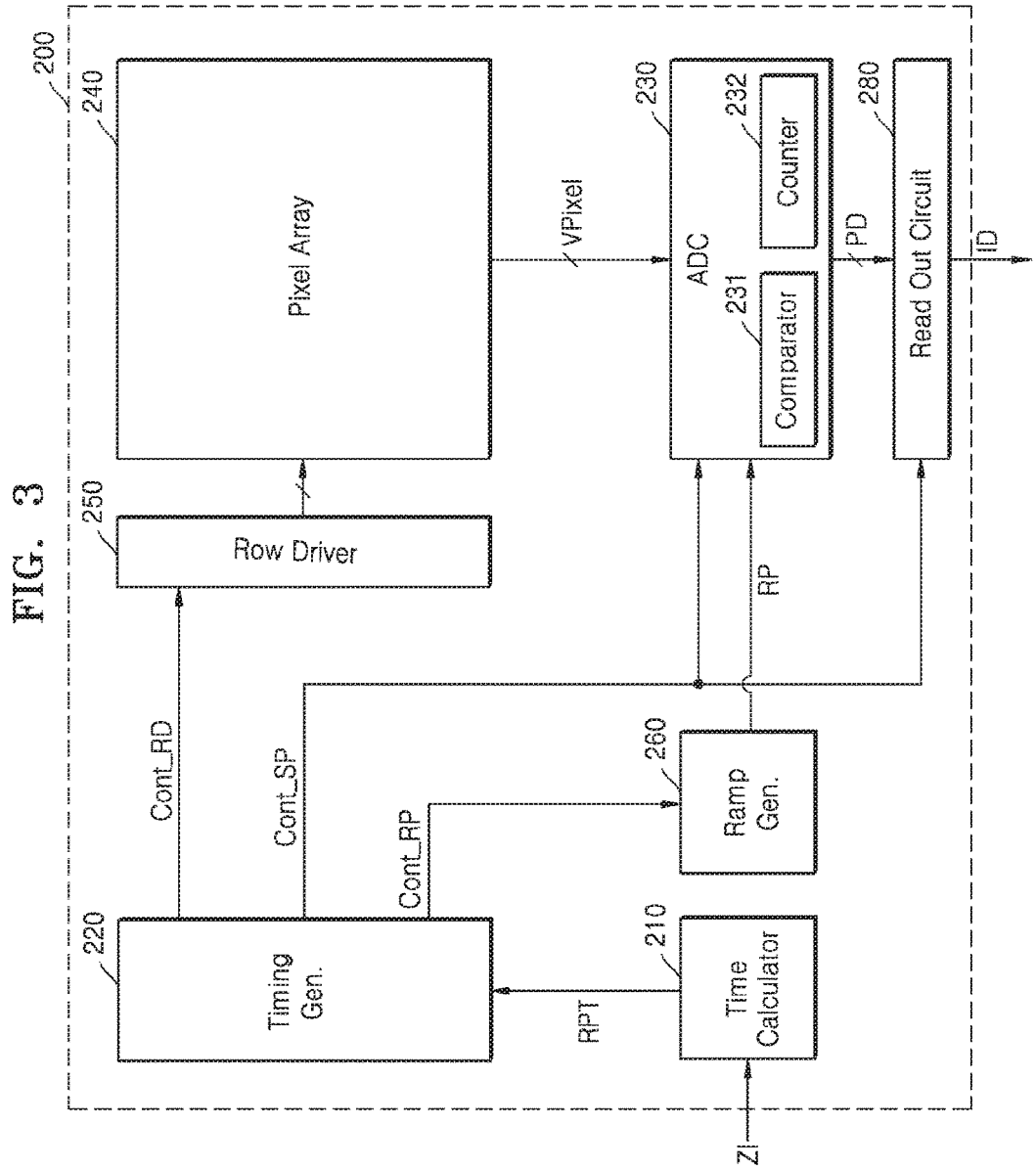
FIG. 3 is a block diagram of an image sensor according to an example embodiment of inventive concepts.

FIG. 3 is a block diagram of the image sensor 200 according to an example embodiment of inventive concepts. In FIG. 3, the same reference numerals as in FIG. 1 denote the same elements, and therefore, repeated descriptions thereof will not be given herein.

Referring to FIG. 3, the image sensor 200 may include the time calculator 210, the timing generator 220, the ADC 230, a pixel array 240, a row driver 250, a ramp generator 260 and a read-out circuit 280.

The time calculator 210 may receive the zoom information ZI and output the row processing time RPT to the timing generator 220. Based on the received row processing time RPT, the timing generator 220 may output a row driver control signal Cont_RD to the row driver 250, may output the sampling control signal Cont_SP to the ADC 230 and the read-out circuit 280, and may output a ramp-control signal Cont_RP to the ramp generator 260. Thus, the timing generator 220 may adjust operation timing of the row driver 250, the ADC 230, the read-out circuit 280, and the ramp generator 260, based on the row processing time RPT.

The row driver 250 may drive the pixel array 240 in row units. For example, the row driver 250 may generate a transmission control signal for controlling transmission transistors of each unit pixel constituting the pixel array 240, a reset control signal for controlling a reset transistor, a selection control signal for controlling a selection transistor, and the like. According to an example embodiment of inventive concepts, in response to the row driver control signal Cont_RD of the timing generator 220 during digital zooming, the row driver 250 may drive at least some rows of the pixel array 240.

The pixel array 240 may include a plurality of photoelectric conversion elements such as photo diodes and/or pinned photo diodes, and may further include a plurality of pixels arranged in rows and columns. The pixel array 240 may sense light using the plurality of photoelectric conversion elements and convert the light into an electrical signal to generate a pixel signal VPixel. The pixel array 240 may output the pixel signal VPixel including a reset signal and a video signal from a row line selected by a row selection signal provided from the row driver 250 to the ADC 230.

The ADC 230 may convert the pixel signal VPixel in an analog domain received from the pixel array 240 into pixel data PD in a digital domain. To this end, the ADC 230 may include a comparator 231 and a counter 232.

The comparator 231 may receive a ramp signal RP from the ramp generator 260, and may compare the received ramp signal RP with the pixel signal VPixel and output a comparison result signal to the counter 232. The counter 232 may count time from when the sampling control signal Cont_SP is received from the timing generator 220 to when the comparison result signal is received from the comparator 231 and generate the pixel data PD corresponding thereto. The counter 232 may output the generated pixel data PD to the read-out circuit 280. The read-out circuit 280 may generate the image data ID based on the received pixel data PD and output the image data ID to the image processor 100 (of FIG. 1).

The ramp generator 260 may receive the ramp-control signal Cont_RP from the timing generator 220 and generate the ramp signal RP based thereon. Furthermore, the ramp generator 260 may output the generated ramp signal RP to the comparator 231.

According to inventive concepts, during the digital zooming, the time calculator 210 may adaptively adjust the row processing time RPT by calculating the row processing time RPT based on the zoom information ZI, and the timing generator 220 may adjust the operation timing of the ADC 230, the row driver 250, the ramp generator 260, the read-out circuit 280, etc. according to the adjusted row processing time RPT so that the row processing time RPT for processing a single row may be prolonged.

Figure 4:
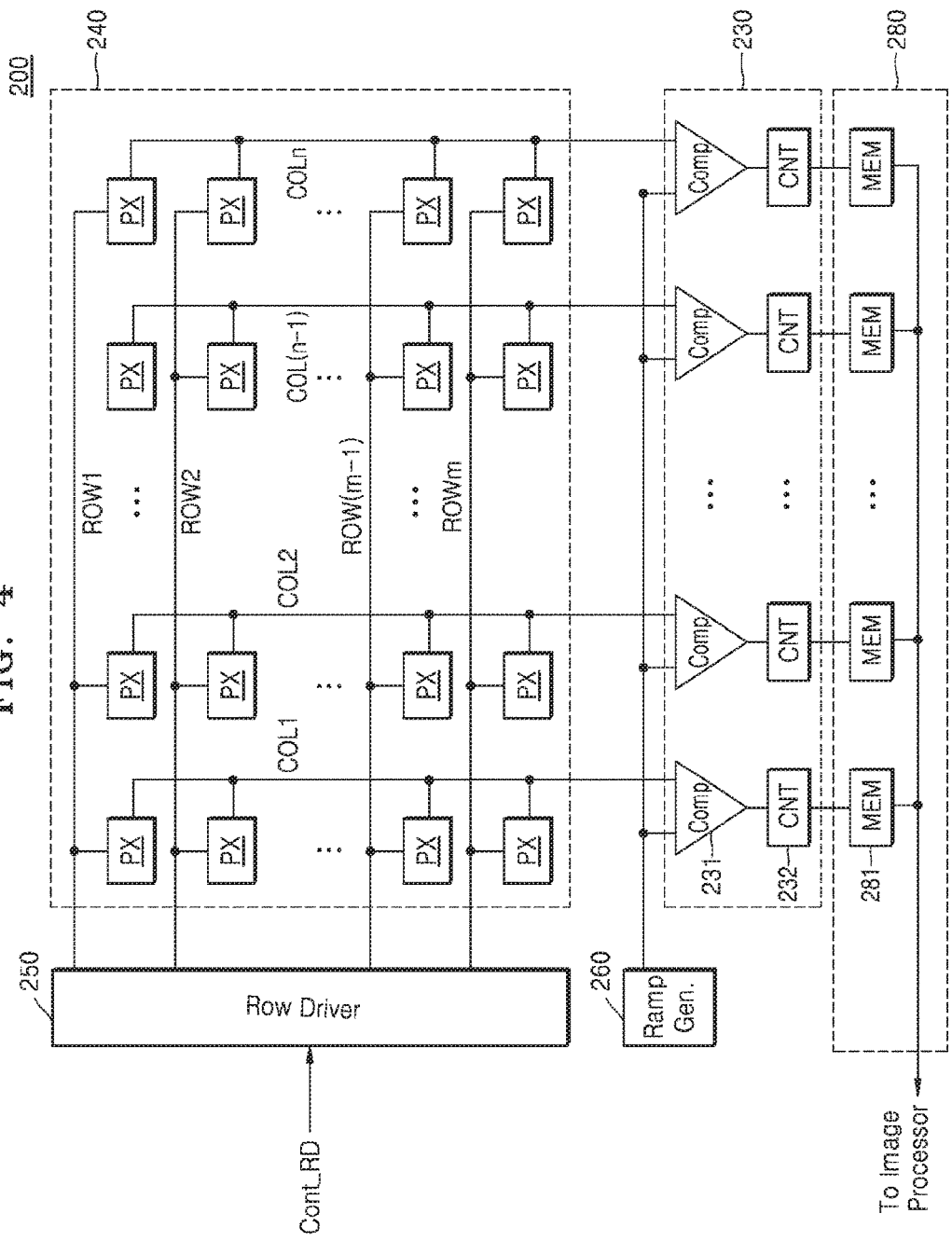
FIG. 4 is a block diagram of an image sensor according to an example embodiment of inventive concepts.

FIG. 4 is a block diagram of the image sensor 200 according to an example embodiment of inventive concepts. In more detail, FIG. 4 is a block diagram of the ADC 230, the pixel array 240, the row driver 250, the ramp generator 260, and the read-out circuit 280 in the image sensor 200. In FIG. 4, the same reference numerals as in FIG. 3 denote the same elements, and therefore, repeated descriptions thereof will not be given herein.

The pixel array 240 may include a plurality of unit pixels PX in the form of a matrix connected to a plurality of row lines ROW1 to ROWm and a plurality of column lines COLl to COLn, respectively. The pixel array may be formed by stacking, e.g. vertically stacking, a semiconductor substrate, an interlayer insulating layer, a color filter layer, and micro-lenses. For example, the semiconductor substrate may be or may include a semiconductor substrate on which a p-type epitaxial layer is formed on a p-type bulk silicon substrate, and photodiodes may be formed by injecting, e.g. implanting, n-type ions into the p-type epitaxial layer. In addition, the interlayer insulating layer may be stacked on the semiconductor substrate. The interlayer insulating layer may include gates of transistors included in unit pixels and conductive lines of multiple layers. According to the example embodiment, a protective layer for protecting elements may be stacked on the interlayer insulating layer. The color filter layer may be stacked on the interlayer insulating layer (or the protective layer), and the color filter layer may include a plurality of color filters. In an example embodiment, a Bayer pattern technique may be applied to the color filter layer. For example, the color filters may include at least one red filter, at least one green filter, and at least one blue filter, or at least one magenta filter, at least one cyan filter, and at least one yellow filter. According to an example embodiment, a flat layer called an overcoat layer may be stacked on the color filter layer. The micro-lenses are stacked on the color filter layer (or the flat layer) and may guide incident light so that the incident light is efficiently incident on photodiodes of unit pixels.

Each of, or at least some of, the plurality of unit pixels PX may include at least one of a red pixel for converting light in a red spectral region into an electrical signal, a green pixel for converting light in a green spectral region into an electrical signal, a blue pixel for converting light in a blue spectral region into an electrical signal, and a depth pixel for converting depth information into an electrical signal using a Time Of Flight (TOF) method. For example, each of the plurality of unit pixels PX may output pixel signals having different voltage levels according to intensity of incident light.

The row driver 250 may decode the row driver control signal Cont_RD generated in the timing generator 220 and may select at least one of the row lines included in the pixel array 240 in response to the decoded row driver control signal Cont_RD. For example, the row driver 250 may select and drive the first to $m^{th}$ row lines ROW1 to ROWm in response to the row driver control signal Cont_RD According to an example embodiment of inventive concepts, the row driver 250 may select and drive only a portion corresponding to the row driver control signal Cont_RD from among the first to $m^{th}$ row lines ROW1 to ROWm during digital zooming. Accordingly, the image sensor 200 according to inventive concepts may set the row processing time RPT to be longer than a reference row processing time because the row driver 250 drives only some of the rows while maintaining a constant frame rate per second (fps) with respect to driving of a single frame constant during the digital zooming.

Each of, or at least some of, the comparators 231 may be connected to any one of the first to $n^{th}$ column lines COL1 to COLn and the ramp generator 260. Any one of the first to $n^{th}$ column lines COL1 to COLn may be connected to a first input terminal of a comparator 231, and the ramp generator 260 may be connected to a second input terminal of a comparator 231. Each of the comparators 231 may receive a pixel signal received from one of the first to $n^{th}$ column lines COL1 to COLn and a ramp signal value generated from the ramp generator 260, compare them with each other, and output a comparison result signal to an output terminal of each of the comparators 231. A difference between a signal sample and a reset sample in the comparison result signal output from the comparator 231 may be picked up and output according to a gradient of a ramp signal. The ramp generator 260 may be operated based on the ramp-control signal Cont_RP generated in the timing generator 220. This will be described later with reference to FIGS. 9A and 9B.

Each counter 232 may be connected to the output terminal of each comparator 231. The counter 232 may include an up/down counter and a bit-wise inversion counter. As described above, the each counter 232 may count time from when the sampling control signal Cont_SP is received from the timing generator 220 to when the comparison result signal is received from the comparator 231 and generate the pixel data PD in a digital domain corresponding thereto.

The read-out circuit 280 may include a plurality of memories 281. Each of the plurality of memories 281 may store pixel data received from the ADC 230 based on the sampling control signal Cont_SP generated by the timing generator 220. Each of the plurality of memories 281 may correspond to static random-access memory (SRAM), but inventive concepts is not limited thereto. A memory 281 may output image data in the digital domain to the image processor 100.

Figure 5:
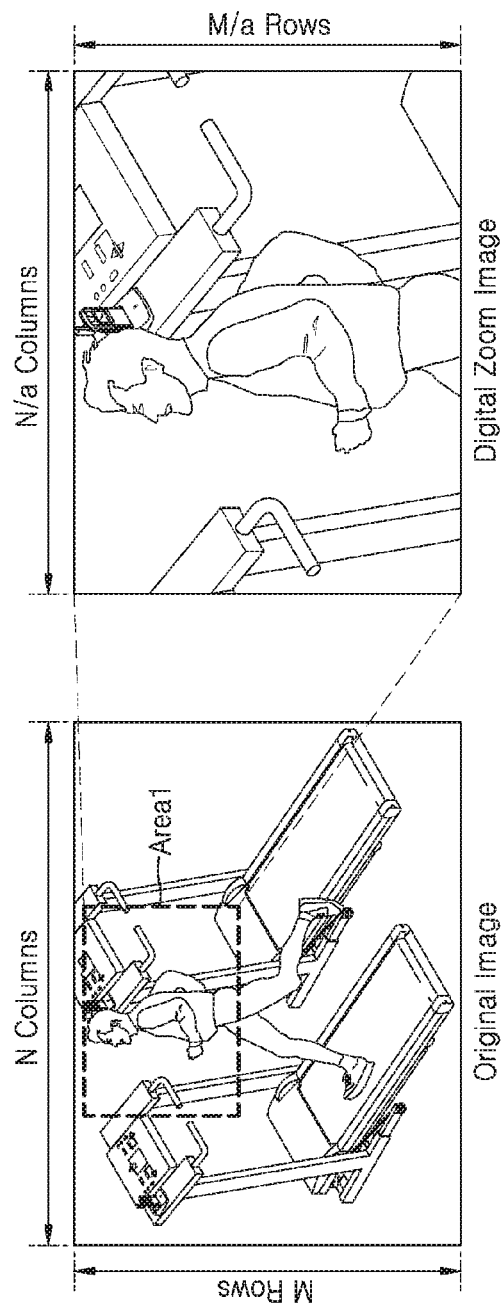
FIG. 5 is a view of an original image according to an example embodiment of inventive concepts and a digital zoom image obtained by digital zooming performed on the original image.

FIG. 5 is a view of an original image according to an example embodiment of inventive concepts and a digital zoom image obtained by digital zooming performed on the original image. In more detail, FIG. 5 is a view of an original image and a digital zoom image produced from ax digital zooming performed on the original image.

Referring to FIG. 5, a user or a host may output a command to an image processing device to perform the ax digital zooming to enlarge a first area Area 1 of the original image. Data for the first area may be formed in some of a plurality of pixels PX included in the pixel array 240.

When processing an original image without digital zooming, the image processing device may acquire data from the plurality of pixels PX connected to N column lines and M row lines, and output image data to a display device. Alternatively, when processing an original image with ax digital zooming, the image processing device may acquire data from the plurality of pixels PX connected to N/a column lines and M/a row lines corresponding to the first area Area 1, and output image data to the display device using the acquired data. Therefore, even when digital zooming is performed, when the same row processing time RPT is used, the image processing device outputs a digital zoom image to the display device by utilizing limited data as compared with the original image. Therefore, image quality deterioration due to a variety of noise may occur in an interpolation process.

According to inventive concepts, since the original image and the digital zoom image are the same in terms of a frame rate per second (fps) for processing a single frame, the total frame processing time of the original image may be the same as that of the digital zoom image. Thus, the row processing time RPT of the digital zoom image may be set to be longer than the row processing time (RPT) of the original image if the original image has a small row number to be processed. Accordingly, the total frame processing time may be set to be the same as that of the original image. According to an example embodiment of inventive concepts, image deterioration of the digital zoom image may be reduced by having the row processing time RPT longer, so as to reduce noise causing image deterioration.

Figure 6:
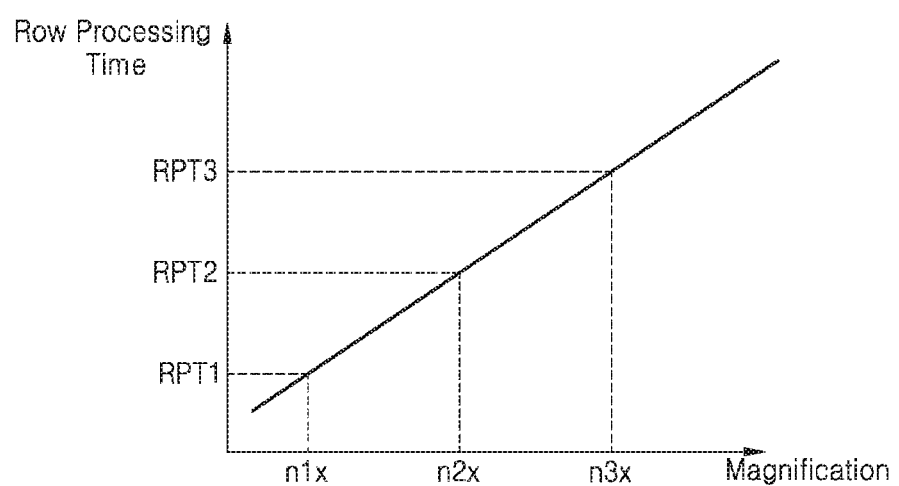
FIG. 6 is a graph of a row processing time for a digital zoom magnification, according to an example embodiment of inventive concepts.

FIG. 6 is a graph of the row processing time RPT for a digital zoom magnification, according to an example embodiment of inventive concepts.

A horizontal axis in FIG. 6 may be the digital zoom magnification and a vertical axis may be the row processing time RPT. Referring to FIG. 6, when the digital zooming is not performed corresponding to when the magnification is nix, the row processing time RPT may be first time RPT1. Furthermore, the row processing time RPT when the magnification is n2× may be second time RPT2 and the row processing time RPT when the magnification is n3× may be third time RPT3. According to an example embodiment of inventive concepts, the row processing time RPT may be proportional to the magnification. Although FIG. 6 shows that the row processing time RPT is proportional to magnification of a linear function, inventive concepts are not limited thereto.

Figure 7:
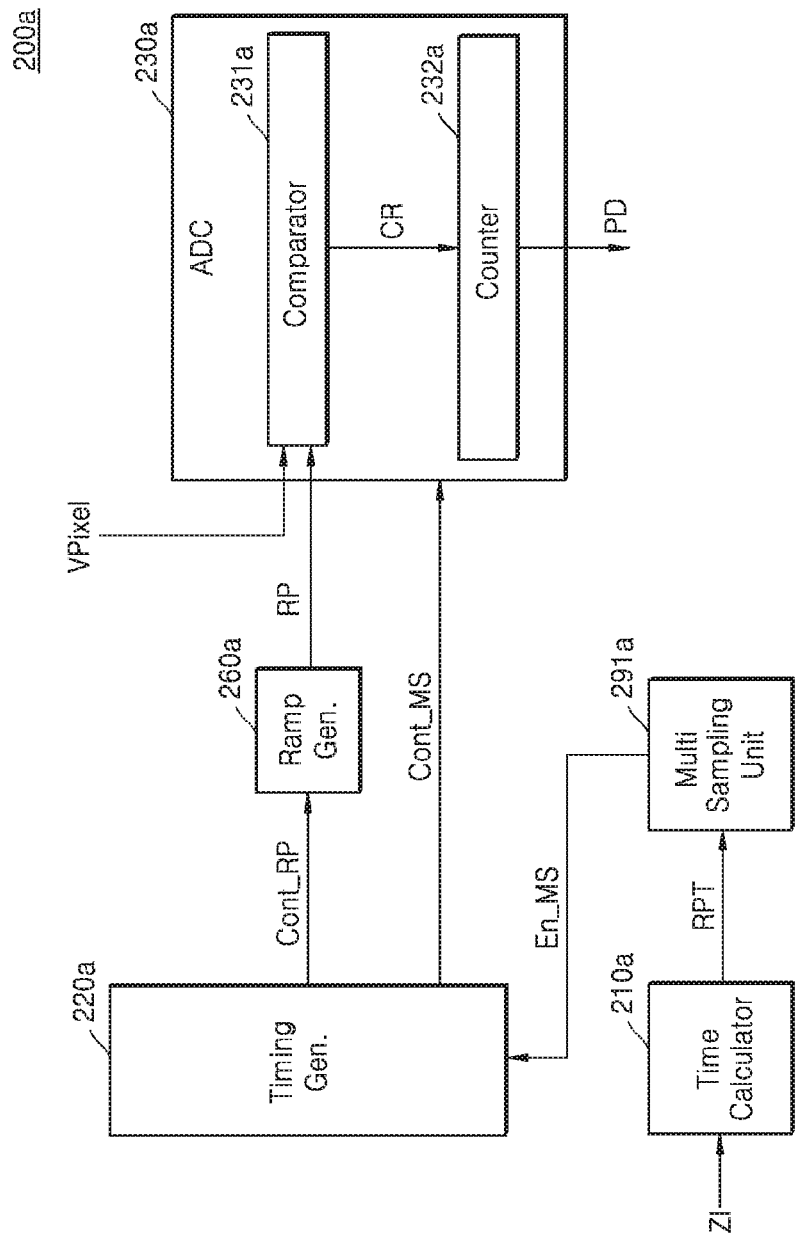
FIG. 7 is a block diagram of an image sensor according to an example embodiment of inventive concepts.

FIG. 7 is a block diagram of an image sensor 200a according to an example embodiment of inventive concepts. In FIG. 7, the same reference numerals as in FIG. 3 denote the same elements, and therefore, repeated descriptions thereof will not be given herein.

Referring to FIG. 7, the image sensor 200a may include a time calculator 210a, a timing generator 220a, an ADC 230a, a ramp generator 260a, and a multi-sampling unit 291a.

The time calculator 210a may output the row processing time RPT calculated based on the received zoom information ZI to the multi-sampling unit 291a. The multi-sampling unit 291a may determine the number of times of sampling based on the received row processing time RPT. The multi-sampling unit 291a may output a multi-sampling enable signal En_MS including information on the determined number of times of sampling to the timing generator 220a. The timing generator 220a may output the ramp-control signal Cont_RP to the ramp generator 260a, based on the number of times of sampling included in the received multi-sampling enable signal En_MS, and output a multi-sampling control signal Cont_MS to the ADC 230a. The ADC 230a may perform multi-sampling on the received pixel signal VPixel based thereon and output the generated pixel data. PD to the read-out circuit 280 (of FIG. 3). The multi-sampling will be described later below with reference to FIGS. 9A and 9B.

An image sensor according to inventive concepts may improve noise of a digital zoom image by determining the number of times of sampling, based on the row processing time RPT and performing multi-sampling on the pixel signal VPixel.

Figure 8:
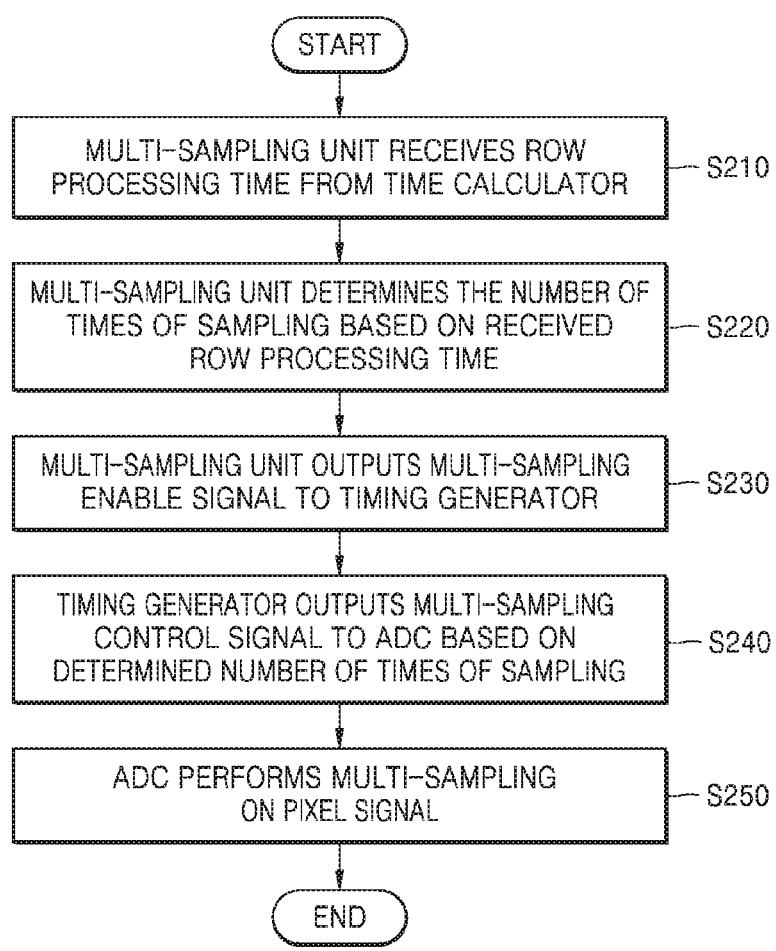
FIG. 8 is a flowchart of a method of operating an image sensor according to an example embodiment of inventive concepts.

FIG. 8 is a flowchart of a method of operating an image sensor according to an example embodiment of inventive concepts. In FIG. 8, the same reference numerals as in FIG. 7 denote the same elements, and therefore, repeated descriptions thereof will not be given herein.

Referring to FIGS. 7 and 8, in operation S210, the multi-sampling unit 291a may receive, from the time calculator 210a, the row processing time RPT calculated based on the zoom information ZI. In operation S220, the multi-sampling unit 291a may determine the number of times of sampling based on the received row processing time RPT. In an example, the multi-sampling unit 291a may determine the number of times of sampling based on a table stored in advance. In an example, the multi-sampling unit 291a may determine the number of times of sampling based on a specific (or, alternatively, predetermined) formula. This will be described later below with reference to FIGS. 10A and 10B.

In operation S230, the multi-sampling unit 291a may output the multi-sampling enable signal En_MS including information on the determined number of times of sampling to the timing generator 220a, In operation S240, the timing generator 220a may output the multi-sampling control signal Cont_MS for multi-sampling to the ADC 230a, based on the determined number of times of sampling. The multi-sampling control signal Cont_MS may include timing control signals for multiple reset sampling and multiple signal sampling. In operation S250, the ADC 230a may perform multi-sampling on the pixel signal VPixel based on the multi-sampling control signal Cont_MS.

Figure 9A:
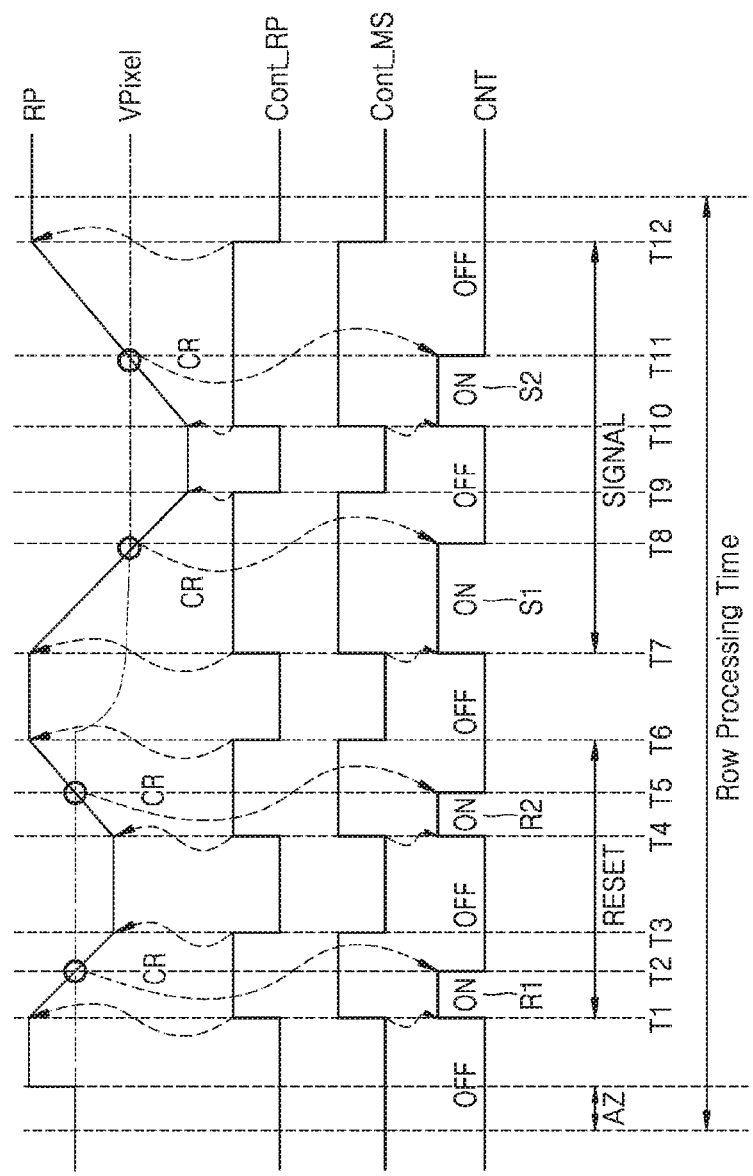
FIG. 9A is a timing diagram of a multi-sampling operation according to an example embodiment of inventive concepts.

FIG. 9A is a timing diagram of a multi-sampling operation according to an example embodiment of inventive concepts. In more detail, FIG. 9A is a timing diagram of the image sensor 200a of FIG. 7 performing a multi-sampling operation in which sampling is performed two times to obtain the pixel data PD (of FIG. 3) from one unit pixel PX (of FIG. 4) during the row processing time RPT.

Referring to FIGS. 7 and 9A, the multi-sampling process of the image sensor 200a may include an auto-zero section AZ, a reset-sampling section RESET, and/or a signal-sampling section SIGNAL. During the auto-zero section AZ, the image sensor 200a may match a level of the pixel signal VPixel with that of the ramp signal RP. During the reset-sampling section RESET, the image sensor 200a may measure a remaining voltage value in pixels as a reference for obtaining the accurate pixel data PD (of FIG. 3). A residual voltage value measured during the reset-sampling section RESET may vary from pixel to pixel. During the signal-sampling section SIGNAL, the image sensor 200a may acquire a signal sample for the pixel data PD (of FIG. 3) obtained by converting light into an electrical signal. The image sensor 200a according to an example embodiment of inventive concepts may perform multi-sampling by performing reset sampling two or more times during the reset-sampling section RESET and performing signal sampling two or more times during the signal-sampling section SIGNAL. FIG. 9A shows a timing diagram for multi-sampling in which sampling is performed twice. The ramp signal RP may transition to a first voltage level after the auto-zero section AZ has ended.

At a point in time T1, the timing generator 220a may enter the reset sampling section RESET by transitioning the multi-sampling control signal Cont_MS for the ADC 230a and the ramp-control signal Cont_RP for the ramp generator 260a to logic high based on the row processing time RPT received from the time calculator 210a. The ramp generator 260a may lower a voltage level of the ramp signal RP with a constant gradient in response to the ramp-control signal Cont_RP transitioning to logic high. Also, a counter 232a may start counting CNT in response to a rising edge of the multi-sampling control signal Cont_MS.

A point in time T2 may indicate a point in time when the voltage level of the ramp signal RP coincides with a voltage level of the pixel signal VPixel. At the point in time T2, a comparator 231a may output a comparison result signal CR to the counter 232a, and the counter 232a may complete the counting CNT accordingly. The counter 232a may count time from the rising edge of the multi-sampling control signal Cont_MS to the comparison result signal CR of the comparator 23_1a and generate the counted value as a first reset sample R1.

At a point in time T3, the timing generator 220a may transition the multi-sampling control signal Cont_MS for the ADC 230a and the ramp-control signal Cont_RP for the ramp generator 260a to a logic low value ("logic low.") The ramp generator 260a may maintain the voltage level of the ramp signal RP constant in response to the ramp control signal Cont_RP transitioning to logic low.

At a point in time T4, the timing generator 220a may transition the multi-sampling control signal Cont_MS for the ADC 230a and the ramp-control signal Cont_RP for the ramp generator 260a to a logic high value ("logic high.") The ramp generator 260a may raise the voltage level of the ramp signal RP with a constant gradient in response to the ramp-control signal Cont_RP transitioning to logic high. Also, the counter 232a may start the counting CNT in response to the rising edge of the multi-sampling control signal Cont_MS.

At a point in time T5 when the pixel signal Pixel coincides with the ramp signal RP, the comparator 231a may output the comparison result signal CR to the counter 232a, and the counter 232a may complete the counting CNT accordingly. The counter 232a may count time from the rising edge of the multi-sampling control signal Cont_MS to the comparison result signal CR of the comparator 231a and generate the counted value as a second reset sample R2.

At a point in time T6, the timing generator 220a may complete the reset-sampling section RESET by transitioning the multi-sampling control signal Cont_MS for the ADC 230a and the ramp-control signal Cont_RP for the ramp generator 260a to logic low. The ramp generator 260a may maintain the voltage level of the ramp signal RP constant in response to the ramp control signal Cont_RP transitioning to logic low.

The ADC 230a may perform synthesis for the first reset sample R1 and the second reset sample R2 generated during the reset sampling section RESET. A reset sample may include a reset information term including substantial information and an unnecessary noise term. As they have the same phase, reset information terms included in each of the first reset sample R1 and the second reset sample R2 are synthesized by a simple operation, while noise terms have different phases and are synthesized through an orthogonal operation. A signal quantity to be increased by the simple operation of the reset information terms may be larger than a signal quantity to be increased through the orthogonal operation of the noise terms. As a result, a signal-to-noise ratio (SNR) of a reset sample synthesized through multi-sampling may be less than that of a reset sample synthesized through a single instance of sampling.

Before entering the signal sampling section SIGNAL and after the reset sampling section RESET is completed according to the control of the row driver 250 (of FIG. 3), the pixel array 240 (of FIG. 3) may convert a light signal received from an object into an electrical signal. Accordingly, the voltage level of the pixel signal VPixel may vary.

At a point in time T7, the timing generator 220a may enter the signal-sampling section SIGNAL by transitioning the multi-sampling control signal Cont_MS for the ADC 230a and the ramp-control signal Cont_RP for the ramp generator 260a to logic high based on the row processing time RPT received from the time calculator 210a. The ramp generator 260a may lower a voltage level of the ramp signal RP with a constant gradient in response to the ramp-control signal Cont_RP transitioning to logic high. Also, the counter 232a may start the counting CNT in response to the rising edge of the multi-sampling control signal Cont_MS.

At a point in time T8 when the pixel signal VPixel coincides with the ramp signal RP, the comparator 231a may output the comparison result signal CR to the counter 232a, and the counter 232a may complete the counting CNT accordingly. The counter 232a may count time from the rising edge of the multi-sampling control signal Cont_MS to the comparison result signal CR of the comparator 231a and may generate the counted value as a first signal sample S1.

At a point in time T9, the timing generator 220a may transition the multi-sampling control signal Cont_MS for the ADC 230a and the ramp-control signal Cont_RP for the ramp generator 260a to logic low. The ramp generator 260a may maintain the voltage level of the ramp signal RP constant in response to the ramp control signal Cont_RP transitioning to logic low.

At a point in time T1.0, the timing generator 220a may transition the multi-sampling control signal Cont_MS for the ADC 230a and the ramp-control signal Cont_RP for the ramp generator 260a to logic high. The ramp generator 260a may raise the voltage level of the ramp signal RP with a constant gradient in response to the ramp-control signal Com_RP transitioning to logic high. Also, the counter 232a may start the counting CNT in response to the rising edge of the multi-sampling control signal Com_MS.

At a point in time T11 when the voltage level of the ramp signal RP becomes equal to the voltage level of the pixel signal Pixel, the comparator 231a may output the comparison result signal CR to the counter 232a, and the counter 232a may complete the counting CNT accordingly. The counter 232a may count time from the rising edge of the multi-sampling control signal Cont_MS to the comparison result signal CR of the comparator 231a and generate the counted value as a second signal sample S2.

At a point in time T12, the timing generator 220a may complete the signal-sampling section SIGNAL by transitioning the multi-sampling control signal Cont_MS for the ADC 230a and the ramp-control signal Cont_RP for the ramp generator 260a to logic low. The ramp generator 260a may maintain the voltage level of the ramp signal RP constant in response to the ramp control signal Cont_RP transitioning to logic low, The ADC 230a may perform synthesis for the first and second signal samples S I and S2 generated during the signal-sampling section SIGNAL. As with the reset sample, the signal sample may include a signal information term including substantial information and an unnecessary noise term, and a signal quantity to be increased by a simple operation of the signal information term may be larger than a signal quantity to be increased through an orthogonal operation of the noise term. Accordingly, an SNR of a signal sample synthesized through multi-sampling may be less than a signal sample synthesized through a single instance of sampling.

The ADC 230a may generate a signal sample synthesized with the synthesized reset sample through a series of the above operations, and a difference between the synthesized signal sample and the synthesized reset sample may be output to the read-out circuit 280 (of FIG. 3) as pixel data in a digital domain.

FIG. 9A shows an example embodiment in which the ramp control signal Cont_RP transitions to logic high when the ramp signal RP starts to rise or fall, and the multi-sampling control signal Cont_MS transitions to logic high when the counting CNBC starts. For example, the ramp control signal Cont_RP may transition to logic low when the ramp signal RP starts to rise or fall, and the multi-sampling control signal Cont_MS may transition to logic low when the counting CNT starts. Accordingly, the ramp control signal Cont_RP and the multi-sampling control signal Cont_MS may operate in the reverse of FIG. 9A. Furthermore, although FIG. 9A illustrates a case where reset sampling and signal sampling for multi-sampling are performed twice each, inventive concepts is not limited thereto. It should be understood that inventive concepts may also be applied to a case where sampling is performed three times or more.

Figure 9B:
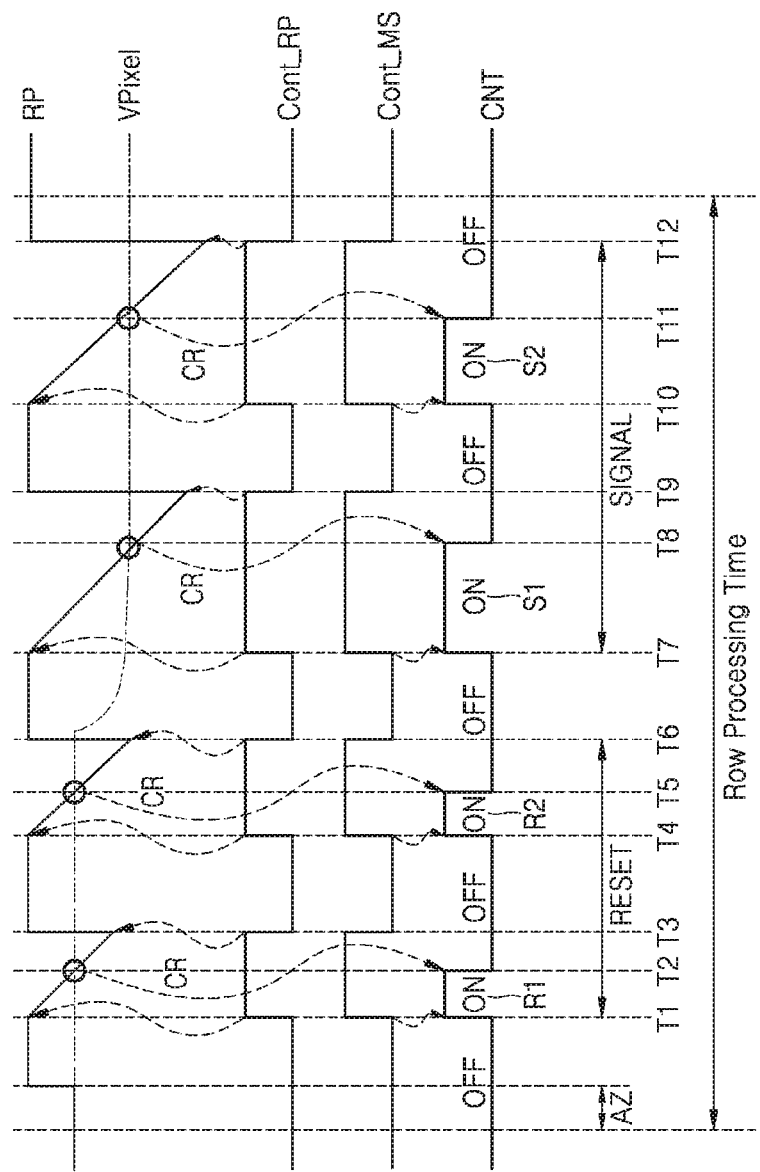
FIG. 9B is a timing diagram of a multi-sampling operation according to an example embodiment of inventive concepts.

FIG. 9B is a timing diagram of a multi-sampling operation according to an example embodiment of inventive concepts. In more detail, FIG. 9B is another timing diagram of the image sensor 200a of FIG. 7 performing a multi-sampling operation in which sampling is performed two times to obtain the pixel data PD (of FIG. 3) from one unit pixel PX (of FIG. 4) during the row processing time RPT. In FIG. 9B, the same reference numerals as in FIG. 9A denote the same elements, and therefore, repeated descriptions thereof will not be given herein.

Referring to FIG. 7 and FIGS. 9A and 9B, in FIG. 9B, at the points in time T3 and T9, the ramp signal RP may transition to the first voltage level at the end of the auto-zero section AZ. As the ramp signal RP transitions to the first voltage level as same as the end of the auto-zero section AZ at the points in time T3 and 19, the voltage level of the ramp signal RP may also be lowered at the points in time T4 and T10 when a rising edge of the ramp control signal Cont_RP occurs in addition to the points in time and 17. Since the method of operating the image sensor according to FIG. 9B is similar to or the same as the method of operating the image sensor according to FIG. 9A, a detailed description thereof will not be given herein.

Figure 10A:
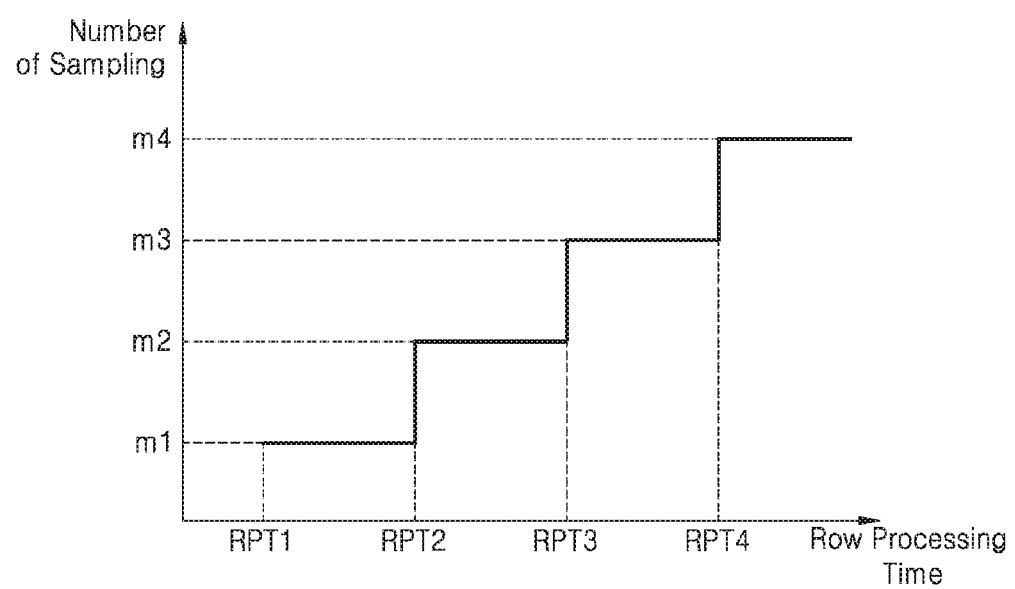

FIGS. 10A and 10B are views of a method of determining the number of times of sampling, according to an example embodiment of inventive concepts. In more detail, FIG. 10A is a view of a method of determining the number of times of sampling according to a formula and/or a graph, and FIG. 10B is a view of a method of determining the number of times of sampling according to a table.

Referring to FIGS. 7 and 10A., when the multi-sampling unit 291a receives the row processing time RPT from the time calculator 210a, the number of times of sampling corresponding to the received row processing time RPT may be determined according to the graph or the formula of FIG. 10A. In an example, the graph or the formula may be dynamically specified (or, alternatively, predetermined.) The multi-sampling unit 291a may determine the number of times of sampling as ml when the received row processing time RPT is between the first time RPT1 and the second time RPT2, determine the number of times of sampling as m2 when the received row processing time RPT is between the second time RPT2 and the third time RPT3, determine the number of times of sampling as m3 when the received row processing time RPT is between the third time RPT3 and fourth time RPT4, and determine the number of times of sampling as m4 when the received row processing time RPT is greater than the fourth time RPT4.

Referring to FIGS. 7 and 10B, when the multi-sampling unit 291a receives the row processing time RPT from the time calculator 210a, the number of times of sampling corresponds to a row processing time table. The row processing time table may be stored in a memory inside the image sensor 200a or may be stored in a memory device outside the image sensor 200a. In an example, the multi-sampling unit 291a may determine the number of times of sampling as ml when the received row processing time RPT is greater than or equal to the first time RPT1 and equal to or less than the second time RPT2, determine the number of times of sampling as m2 when the received row processing time RPT is greater than the second time RPT2 and equal to or less than the third time RPT3, determine the number of times of sampling as m3 when the received row processing time RPT is greater than the third time RPT3 and equal to or less than the fourth time RPT4, and determine the number of times of sampling as m4 when the received row processing time RPT is greater than the fourth time RPT4.

Figure 11:
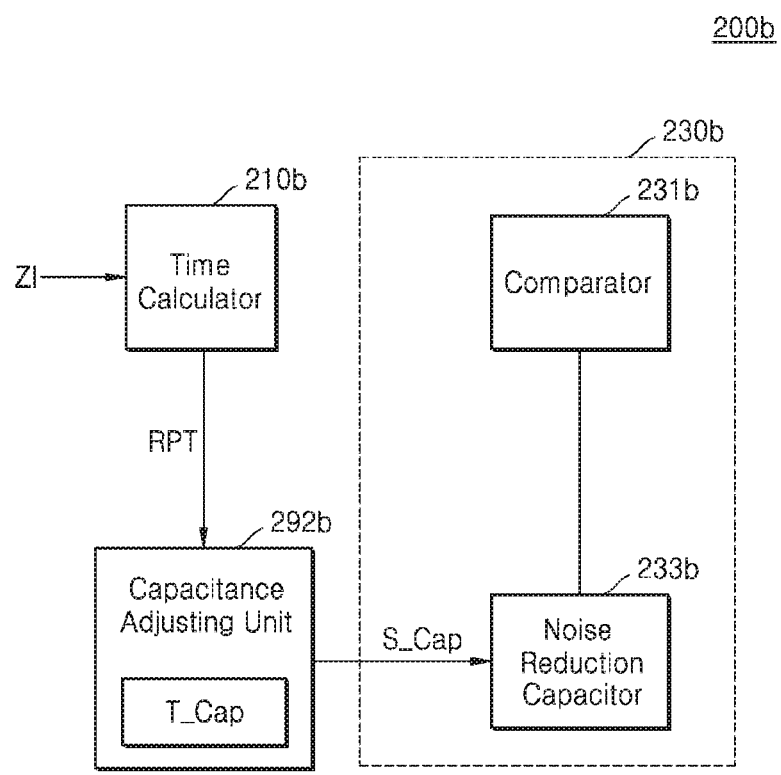
FIG. 11 is a block diagram of an image sensor according to an example embodiment of inventive concepts.

FIG. 11 is a block diagram of an image sensor 200b according to an example embodiment of inventive concepts. In FIG. 11, the same reference numerals as in FIG. 3 denote the same elements, and therefore, repeated descriptions thereof will not be given herein.

Referring to FIG. 3 and FIG. 11, the image sensor 200b may include a time calculator 210b, an ADC 230b, and a capacitance adjusting unit 292b. In addition, the ADC 230b may include a comparator 231b and a noise reduction capacitor 233b. The comparator 231b may be the same as or similar to the comparator 231 of FIG. 3, and thus a description thereof will not be given herein.

The noise reduction capacitor 233b may be connected to the comparator 231b to perform charge-sharing, thereby reducing noise in a sampling signal. Also, the noise reduction capacitor 233b may perform charge-sharing during the row processing time RPT. Accordingly, the noise reduction capacitor 233b may perform charge-sharing with a larger amount of charge if the row processing time RPT is longer. The image sensor 200b according to an example embodiment of inventive concepts may adaptively adjust variable capacitance of the noise reduction capacitor 233b, based on the row processing time RPT, to reduce noise due to the charge-sharing to a large value, e.g. the maximum.

The time calculator 210b may receive the zoom information ZI from the image processor 100 (of FIG. 1) and may calculate the row processing time RPT based on the received zoom information ZI. The time calculator 210b may output the calculated row processing time RPT to the capacitance adjusting unit 292b. The capacitance adjusting unit 292b may determine a capacitance value of the noise reduction capacitor 233b based on the row processing time RPT.

In an example of inventive concepts, the capacitance adjusting unit 292b may determine the capacitance value of the noise reduction capacitor 233b based on a stored capacitance table T_Cap. In addition, the capacitance adjusting unit 292b may determine the capacitance value in proportion to the row processing time RPT. As described above, the amount of charge of the charge-sharing by the noise reduction capacitor 233b is proportional to the row processing time RPT and the amount of charge and the capacitance value are also proportional to each other. Therefore, the capacitance adjusting unit 292b may maximize the amount of charge of the charge-sharing by determining the capacitance value in proportion to the row processing time RPT.

The capacitance adjusting unit 292b may adjust the variable capacitance of the noise reduction capacitor 233b to the determined capacitance value through a capacitance control signal S_Cap. In an example, the capacitance adjusting unit 292b may adjust the capacitance value by adjusting an interval between electrodes of the noise reduction capacitor 233b.

Figure 12:
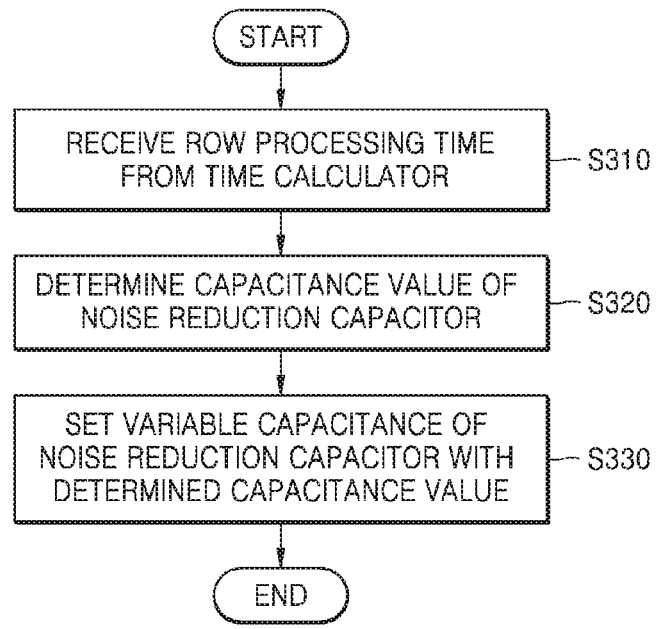
FIG. 12 is a flowchart of a method of operating a capacitance adjusting unit according to an example embodiment of inventive concepts.

FIG. 12 is a flowchart of a method of operating the capacitance adjusting unit 292b, according to an example embodiment of inventive concepts.

Referring to FIGS. 11 and 12, in operation S310, the capacitance adjusting unit 292b may receive, from the time calculator 210a, the row processing time RPT calculated based on the zoom information ZI. In operation S320, the capacitance adjusting unit 292b may determine a capacitance value for the variable capacitance of the noise reduction capacitor 233b based on the row processing time RPT. In an example, the capacitance adjusting unit 292b may determine the capacitance value based on the stored capacitance table T_Cap. In operation S330, the capacitance adjusting unit 292b may set the variable capacitance of the noise reduction capacitor 233b with the determined capacitance value.

Figure 13:
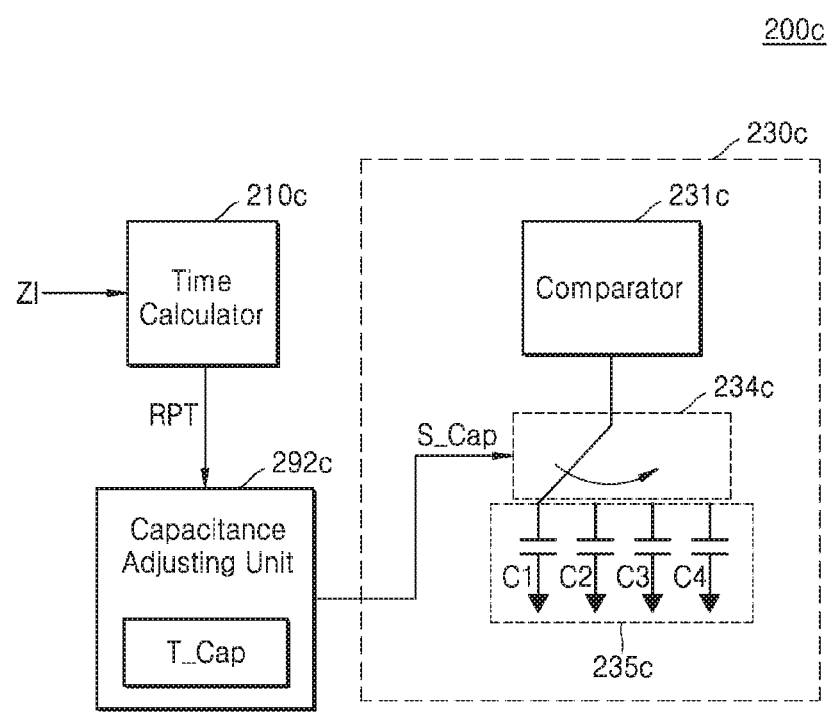
FIG. 13 is a block diagram of an image sensor according to an example embodiment of inventive concepts.

FIG. 13 is a block diagram of an image sensor 200c according to an example embodiment of inventive concepts.

In FIG. 13, the same reference numerals as in FIG. 11 denote the same elements, and therefore, repeated descriptions thereof will not be given herein.

Referring to FIG. 13, the image sensor 200c may include a time calculator 210c, an ADC 230c, and a capacitance adjusting unit 292c. In addition, the ADC 230c may include a comparator 231c, a noise reduction capacitor switch 234c, and a noise reduction capacitor circuit 235c. The time calculator 210c, the capacitance adjusting unit 292c, and the comparator 231c may respectively be the same as or similar to the time calculator 210b, the capacitance adjusting unit 292b, and the comparator 231b of FIG. 11, and thus a description thereof will not be given herein.

The capacitance adjusting unit 292c may output, to the noise reduction capacitor switch 234c, the capacitance control signal S_Cap corresponding to the determined capacitance value. The noise reduction capacitor switch 234c may connect a noise reduction capacitor having the determined capacitance value to the comparator 231c in response to the capacitance control signal S_Cap. To this end, the noise reduction capacitor circuit 235c may include a plurality of noise reduction capacitors having different capacitances C1 to C4.

In an example, the capacitance adjusting unit 292c may determine the first capacitance C1 as a variable capacitance of the noise reduction capacitor based on the row processing time RPT and the capacitance table T Cap received from the time calculator 210c. The capacitance adjusting unit 292c may output the capacitance control signal S_Cap to the noise reduction capacitor switch 234c to set a noise reduction capacitor to the first capacitance C1. The noise reduction capacitor switch 234c may connect the noise reduction capacitor having the first capacitance C1 to the comparator 231 accordingly.

Figure 14:
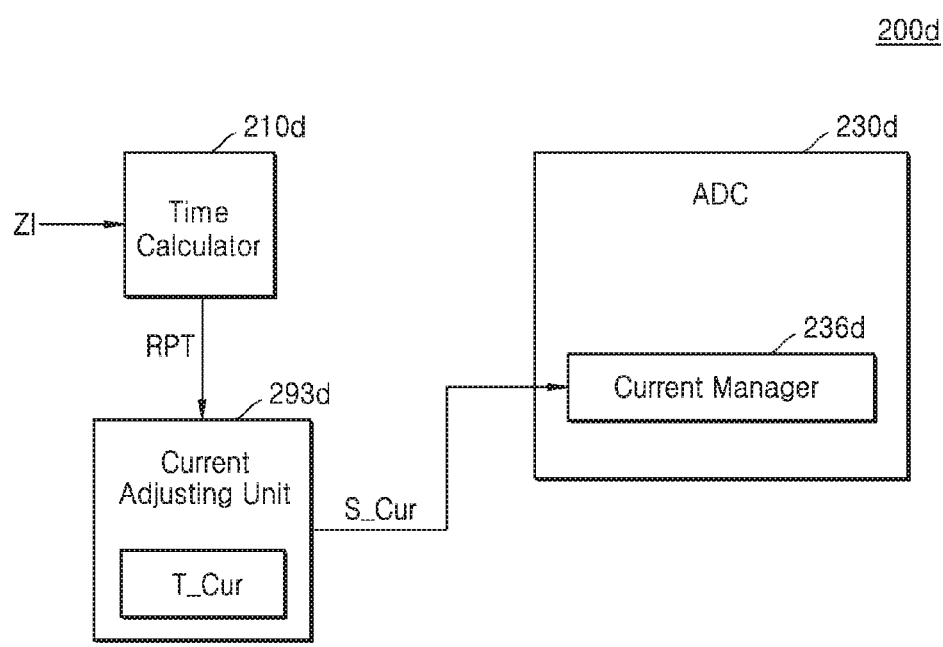
FIG. 14 is a block diagram of an image sensor according to an example embodiment of inventive concepts.

FIG. 14 is a block diagram of an image sensor 200d according to an example embodiment of inventive concepts. In FIG. 14, the same reference numerals as in FIG. 3 denote the same elements, and therefore, repeated descriptions thereof will not be given herein.

Referring to FIG. 14, the image sensor 200d may include a time calculator 210d, an ADC 230d, and a current adjusting unit 293d, wherein the ADC 230d may include a current manager 236d. The time calculator 210d may be substantially the same as or similar to the time calculator 210 of FIG. 3, and a description thereof will not be given herein.

The time calculator 210d may receive the zoom information ZI from the image processor 100 (of FIG. 1) and may calculate the row processing time RPT based on the received zoom information ZI. The time calculator 210d may output the calculated row processing time RPT to the current adjusting unit 293d.

The current manager 236d may control a current consumed in the ADC 230d. Although FIG. 14 shows the current manager 236d in the ADC 230d, inventive concepts is not limited thereto and the current manager 236d may control current consumption of the ADC 230d outside the ADC 230d.

The current adjusting unit 293d may output a current adjusting signal S_Cur to the current manager 236d based on the row processing time RPT and a current table T_Cur received from the time calculator 210d. The current manager 236d may adjust a current of the ADC 230d based on the received current regulation signal S_Cur. For example, the current adjusting unit 293d may adjust the current consumption of the ADC 230d based on the row processing time RPT. According to an example embodiment of inventive concepts, the current adjusting unit 293d may be set such that the current consumption of the ADC 230d is inversely proportional to the row processing time RPT. In more detail, the current adjusting unit 293d may output the current adjusting signal S_Cur set such that the current consumption of the ADC 230d is inversely proportional to the row processing time RPT, to the current manager 236d. The image sensor 200d according to inventive concepts saves current consumption in an area where current is not actually required or desired, by adaptively adjusting the current consumption of the ADC 230d based on the row processing time RPT according to digital zooming, thereby reducing power consumption of the image sensor 200d.

Figure 15:
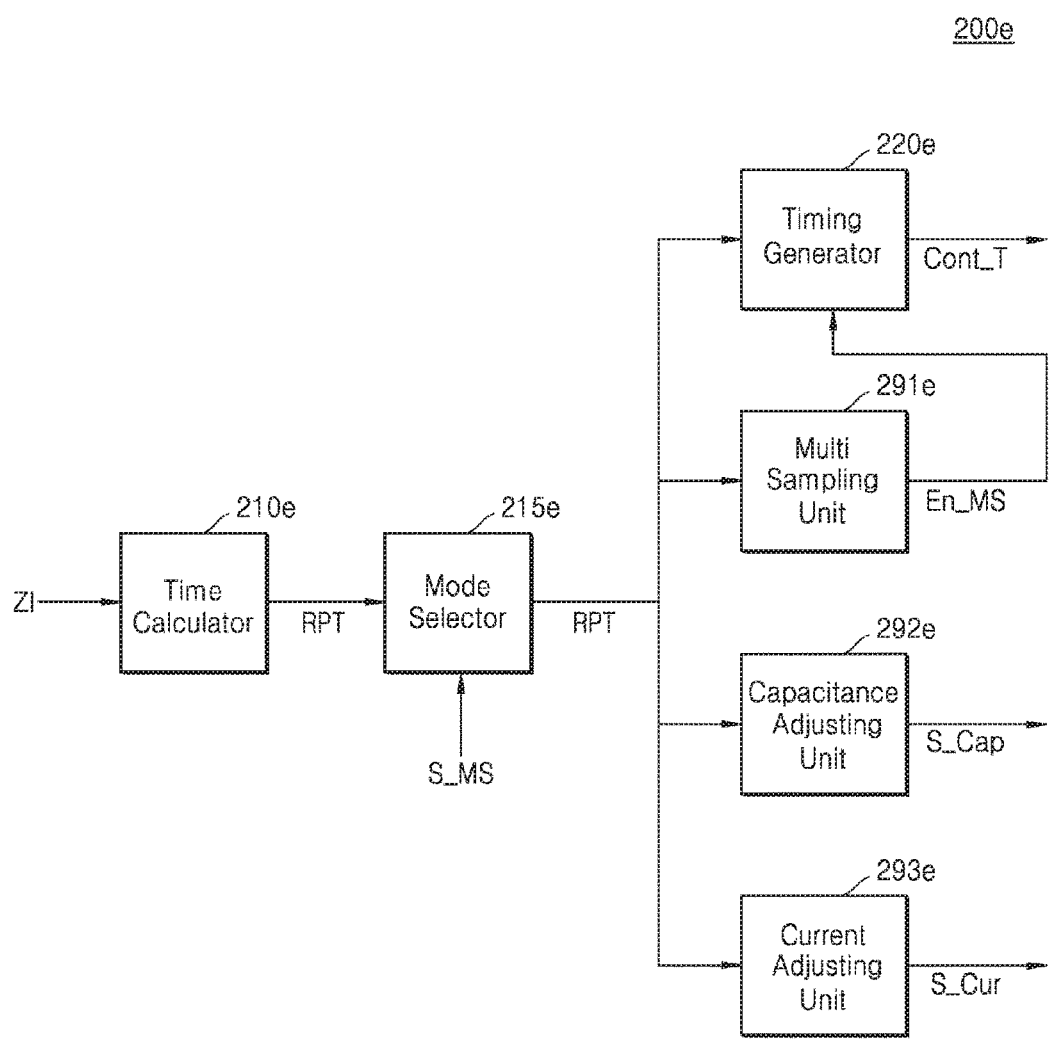
FIG. 15 is a block diagram of an image sensor according to an example embodiment of inventive concepts.

FIG. 15 is a block diagram of an image sensor 200e according to an example embodiment of inventive concepts.

Referring to FIG. 15, the image sensor 200e may include a time calculator 210e, a mode selector 215e, a timing generator 220e, a multi-sampling unit 291e, a capacitance adjusting unit 292e, and a current adjusting unit 293e. The time calculator 210e, the timing generator 220e, the multi-sampling unit 291e, the capacitance adjusting unit 292e, and the current adjusting unit 293e may respectively be the same as or similar to the time calculator 210, the timing generator 220, the multi-sampling unit 291a, the capacitance adjusting units 292b and 292c, and the current adjusting unit 293d of FIGS. 1 to 15, and thus a description thereof will not be given herein.

The mode selector 215e may receive a mode selection signal S_MS from outside (for example, the image processor 100 (of FIG. 1), a host, or a user), and may receive the row processing time RPT from the time calculator 210e. The mode selection unit 215e may output the row processing time RPT to at least one of the timing generator 220e, the multi-sampling unit 291e, the capacitance adjusting unit 292e, and the current adjusting unit 293e based on the received mode selection signal S_MS. In response, the timing generator 220e may output various timing control signals Cont_T to the ADC 230 (of FIG. 1) and the ramp generator 260 (of FIG. 3) based on the received row processing time RPT, and the multi-sampling unit 291e may output the multi-sampling enable signal En_MS to the timing generator 220e based on the received row processing time RPT. Furthermore, the capacitance adjusting unit 292e may output the capacitance adjusting signal S_Cap to the noise reduction capacitor 233b (of FIG. 11) based on the received row processing time RPT, and the current adjusting unit 293e may output the capacitance adjusting signal S_Cap to the current manager 236d (of FIG. 14) based on the received row processing time RPT.

Figure 16:
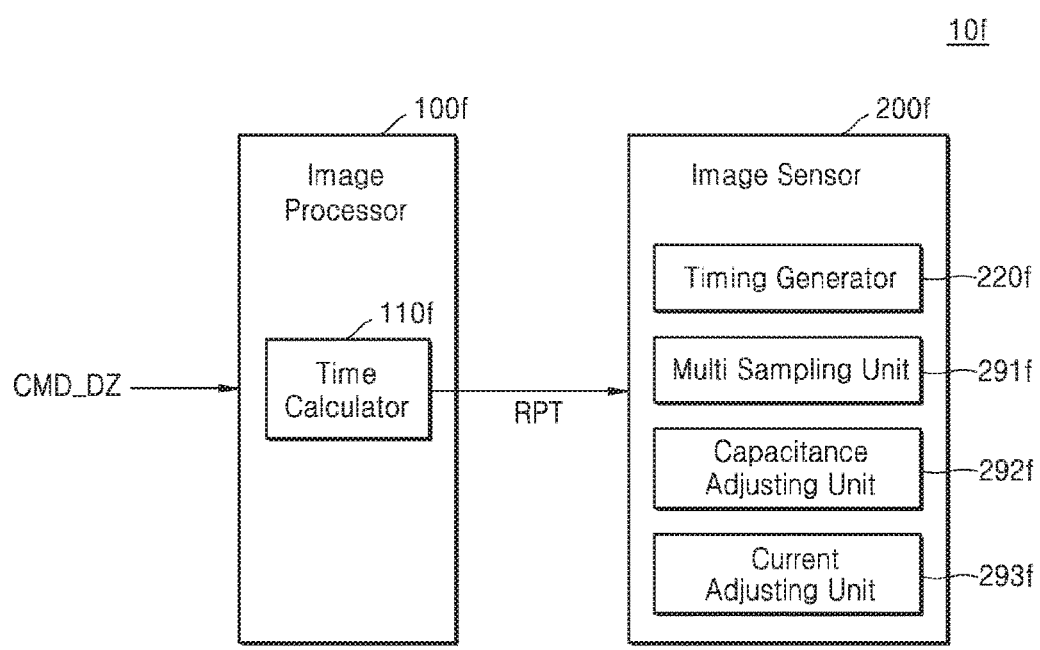
FIG. 16 is a block diagram of an image processing device according to an example embodiment of inventive concepts.

FIG. 16 is a block diagram of an image processing device 10f according to an example embodiment of inventive concepts.

Referring to FIG. 16, the image processing device 10f may include an image processor 100f and an image sensor 200f. The image processor 100f may include a time calculator 110f and the image sensor 200f may include a timing generator 220f, a multi-sampling unit 291f, a capacitance adjusting unit 292f, and a current adjusting unit. In FIG. 16, the image processing device 10f or the image sensor 200f included therein may respectively be substantially the same as or similar to the image processing device 10 or the image sensors 200 to 200e included therein described with reference to FIGS. 1 to 14 except that the time calculator 110f is included in the image processor 100f.

The time calculator 110f may receive the digital zoom command CMD_DZ and calculate, based thereon, the row processing time RPT. The time calculator 110f may output the calculated row processing time RPT to the image sensor 200f. In more detail, the time calculator 110f may output the calculated row processing time RPT to at least one of the timing generator 220f, the multi-sampling unit 291f, the capacitance adjusting unit 292f, and the current adjusting unit 293f. In response, the timing generator 220f may adjust timing of the ADC 230 (of FIG. 1) and the ramp generator 260 (of FIG. 3) based on the received raw processing time RPT, and the multi-sampling unit 291f may output a multi-sampling enable signal to the timing generator 220f based on the received row processing time RPT. Furthermore, the capacitance adjusting unit 292f may output a capacitance adjusting signal to the noise reduction capacitor 233b (of FIG. 11), based on the received row processing time RPT, and the current adjusting unit 293f may output a current adjusting signal to the current manager 236d, based on the received row processing time RPT.

Figure 17:
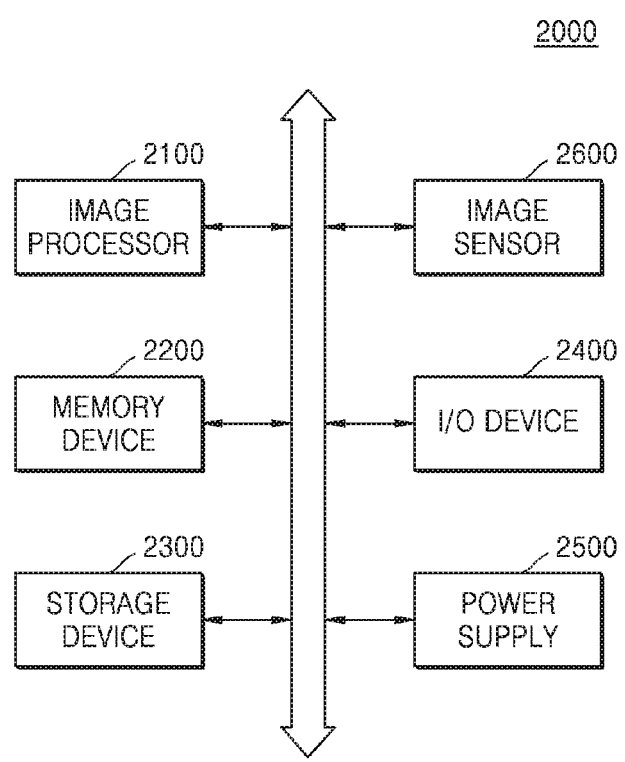
FIG. 17 is a block diagram of a computing system including an image sensor, according to an example embodiment of inventive concepts.

FIG. 17 is a block diagram of a computing system 2000 including an image sensor 2600, according to an example embodiment of inventive concepts.

Referring to FIG. 17, the computing system 2000 may include an image processor 2100, a memory device 2200, a storage device 2300, an input/output device 2400, a power supply 2500, and an image sensor 2600. The image sensor 2600 may include image sensors according to the example embodiments of inventive concepts described above with reference to FIGS. 1 to 16. Although not shown in FIG. 17, the computing system 2000 may further include ports capable of communicating with video cards, sound cards, memory cards, USB devices, or other electronic devices.

The image processor 2100 may perform certain calculations or tasks. The image processor 2100 may include image processors according to the example embodiments of inventive concepts described above with reference to FIGS. 1 to 16. For example, the image processor 2100 may be or may include a micro-processor or a central processing unit (CPU). The image processor 2100 may communicate with the memory device 2200, the storage device 2300, and the input/output device 2400 via an address bus, a control bus, and a data bus. For example, the image processor 2100 may be connected to an expansion bus, such as a Peripheral Component Interconnect (PCI) bus. When receiving a digital zoom command from a host or the like, the image processor 2100 may, according to the digital zoom command, output zoom information and/or row processing time RPT to the image sensor 2600 via a bus.

The memory device 2200 may store data desired, e.g. necessary, for an operation of the computing system 2000. For example, the memory device 2200 may be dynamic random-access memory (DRAM), mobile DRAM, SRAM, or a nonvolatile memory device.

Chips of the memories may be implemented in the memory device 2200 using various types of packages, either individually or together. For example, the chips may be packaged as a package such as a Package on Package (PoP), Ball grid arrays (BGAs), Chip scale packages (CSPs), a Plastic Leaded Chip Carrier (PICC), a Plastic Dual In-Line Package (PD1P), a Die in Waffle Pack, a Die in Wafer Form, a Chip On Board (COB), a Ceramic Dual In-Line Package (CERDIP), or a Plastic Metric Quad Flat Pack (MQFP).

The storage device 2300 may include a Solid-State Drive (SSD), a Hard Disk Drive (HDD), a Compact Disc-Read Only Memory (CD-ROM), and the like. The input/output device 2400 may include an input means such as a keyboard, a keypad, a mouse, etc., and output units such as a printer or a display. The power supply 2500 may supply an operating voltage desired, e.g. required, for the operation of the computing system 2000.

The image sensor 2600 may be connected to the image processor 2100 via buses or other communication links to perform communication. When receiving the zoom information corresponding to the digital zoom command from the image processor 2100, the image sensor 2600 may adjust the row processing time RPT based on the zoom information, according to the example embodiments of inventive concepts. Accordingly, the image sensor 2600 according to inventive concepts may reduce noise due to the digital zooming, and may reduce power consumption of the image sensor 2600. The image sensor 2600 and the image processor 2100 may be integrated on one chip or may be integrated on different chips, respectively. The computing system 2000 should be understood as any computing system that uses an image sensor. For example, the computing system 2000 may include a digital camera, a mobile phone, a personal digital assistant (PDA), a portable multimedia player (PMP), a smartphone, a tablet PC, or the like.

While inventive concepts has been particularly shown and described with reference to example embodiments thereof, it will be understood that various changes in form and details may be made therein without departing from the spirit and scope of the following claims.

What is claimed is:

1. An image sensor comprising:
   a pixel array including a plurality of pixels arranged in rows and columns and configured to generate pixel signals from the plurality of pixels;
   a time calculator configured to receive zoom information corresponding to digital zooming, and configured to calculate a row processing time available for processing the pixel signals from the plurality of pixels included in a single row based on the zoom information;
   a timing generator configured to generate at least one control signal based on the row processing time; and
   an Analog-to-Digital Converter (ADC) configured to generate pixel data by performing sampling on the pixel signals according to the at least one control signal,
   wherein the ADC includes,
      a comparator configured to receive a ramp signal and output time information by comparing the ramp signal and the pixel data, and
      a counter configured to covert the time information into digital information.

2. The image sensor of claim 1, wherein
   the zoom information includes a digital zoom magnification, and
   the time calculator is further configured to calculate the row processing time to be proportional to the digital zoom magnification.

3. The image sensor of claim 1, wherein
   the zoom information includes information on a row number desired for processing, the row number having changed in correspondence with the digital zooming, and
   the time calculator is configured to calculate the row processing time to be inversely proportional to the row number desired for processing.

4. The image sensor of claim 1, further comprising:
   a multi-sampling unit configured to perform sampling at least two times by controlling the ADC, and configured to determine a number of times of sampling based on the row processing time.

5. The image sensor of claim 4, wherein
   the multi-sampling unit is configured to output a multi-sampling enable signal including information on the number of times of sampling to the timing generator, and
   the timing generator is configured to output to the ADC a control signal for performing reset sampling and signal sampling for the pixel signals in response to the multi-sampling enable signal, wherein at least one of the reset sampling and the signal sampling is performed a plurality of times.

6. The image sensor of claim 4, wherein
   the multi-sampling unit is configured to output a first number of times of sampling based on a first row processing time and a second number of times of sampling based on a second row processing time which is longer than the first row processing time, wherein
   the second number of times of sampling is the greater than or equal to the first number of times of sampling.

7. The image sensor of claim 1, wherein
   the ADC further includes a noise reduction capacitor having variable capacitance, and the image sensor further comprises:
   a capacitance adjusting unit configured to adjust the variable capacitance based on the row processing time.

8. The image sensor of claim 7, wherein
   the capacitance adjusting unit is configured to adjust the noise reduction capacitor to a first variable capacitance based on a first row processing time, and adjust the noise reduction capacitor to a second variable capacitance based on a second row processing time which is longer than the first row processing time, wherein
   the second variable capacitance is greater than or equal to the first variable capacitance.

9. The image sensor of claim 1, further comprising:
   a read-out circuit that receives the pixel data from the ADC, generates a generated image data based on the pixel data, and outputs the generated image data.

10. The image sensor of claim 1, further comprising:
    a current adjusting unit configured to adjust current consumption of the ADC based on the row processing time.

11. The image sensor of claim 1, further comprising:
    a ramp generator configured to receive a ramp-control signal from the timing generator, generate the ramp signal, and output the ramp signal to the comparator.

12. An image processing device comprising:
    an image processor configured to calculate a row processing time available for processing pixel signals for a plurality of pixels included in a single row, based on zoom information corresponding to digital zooming; and
    an image sensor including a timing generator configured to generate at least one control signal based on the row processing time, and an ADC configured to generate pixel data by performing sampling on the pixel signals according to the at least one control signal,
    wherein the image sensor further includes a multi-sampling unit configured to perform sampling a number of times by controlling the ADC, and configured to determine the number of times of sampling based on the row processing time, wherein the number of times is at least two.

13. The image processing device of claim 12, wherein
    the zoom information includes information on a row number desired for processing, the row number having changed in correspondence with the digital zooming, and the image processor is configured to calculate the row processing time to be inversely proportional to the row number desired for processing.

14. The image processing device of claim 12, wherein
the ADC further includes a noise reduction capacitor having variable capacitance, and
the image sensor further includes a capacitance adjusting unit configured to adjust the variable capacitance of the noise reduction capacitor based on the row processing time.

15. The image processing device of claim 12, wherein the image sensor is configured to receive the zoom information from at least one of a user or a host.

16. A computer system comprising:
an image processor configured to adaptively adjust an adjusted row processing time in response to receiving a digital zoom command; and
an image sensor configured to sample an image according to the adjusted row processing time,
wherein the image sensor includes,
an Analog-to-Digital Converter (ADC) configured to sample the image by converting an analog signal associated with the image to a digital signal associated with the image, and
a current manager configured to adjust a current of the ADC based on adjusted row processing time.

17. The computer system of claim 16, wherein the image processor is configured to adaptively adjust the adjusted row processing time in response to receiving the digital zoom command from at least one of a user and a host.

18. The computer system of claim 16, further comprising:
a memory device configured to store data associated with the image sensor; and
a power supply configured to supply a power associated with the computer system.

19. The computer system of claim 16, wherein the current manager is configured to adjust the current of the analog-to-digital converter inversely proportional to the adjusted row processing time.

20. The computer system of claim 16, wherein the image sensor further includes,
a current adjusting unit configured to output a current adjusting signal to the current manager, the current adjusting unit being based on the adjusted row processing time.

* * * * *